US006542088B1

(12) United States Patent
Bielski et al.

(10) Patent No.: US 6,542,088 B1
(45) Date of Patent: Apr. 1, 2003

(54) MULTITURN ROTARY ENCODER WITH MULTIPLE CODE CARRIERS COUPLED BY A REDUCTION GEAR

(75) Inventors: Steffen Bielski, Garching/Alz (DE); Kurt Feichtinger, Palling (DE); Alfons Spies, Seebruck (DE); Erich Strasser, Trostberg (DE); Johann Mitterreiter, Chieming (DE); Hermann Meyer, Weissbach (DE); Andreas Schroter, Traunstein (DE)

(73) Assignee: Dr. Johannes Heidenheim GmbH, Traunrent (DE)

( * ) Notice: Subject to any disclaimer, the term of this patent is extended or adjusted under 35 U.S.C. 154(b) by 0 days.

(21) Appl. No.: 09/674,840

(22) PCT Filed: May 5, 1999

(86) PCT No.: PCT/EP99/03056
§ 371 (c)(1),
(2), (4) Date: Mar. 28, 2001

(87) PCT Pub. No.: WO99/57522
PCT Pub. Date: Nov. 11, 1999

(30) Foreign Application Priority Data

May 6, 1998 (DE) .......................................... 198 20 014

(51) Int. Cl.$^7$ ................................................ H03M 1/22
(52) U.S. Cl. ................................ 341/15; 341/16; 341/9; 341/10; 341/11; 341/12; 341/13; 341/171; 341/2; 250/231.13; 250/231.14; 250/231.18
(58) Field of Search ...................... 341/15, 13, 9, 341/16, 171, 11, 12, 14

(56) References Cited

U.S. PATENT DOCUMENTS

| 4,530,155 A | 7/1985 | Burhardt et al. |
| 4,660,288 A | 4/1987 | Dangschat |

(List continued on next page.)

FOREIGN PATENT DOCUMENTS

DE    92 01 404.6    5/1992

(List continued on next page.)

OTHER PUBLICATIONS

"Inkremental Und Absolut," Electrotechnik, vol. 70, No. 22, Dec. 16, 1998, pp. 38 and 42.

(List continued on next page.)

Primary Examiner—Michael Tokar
Assistant Examiner—Lam T. Mai
(74) Attorney, Agent, or Firm—Brinks Hofer Gilson & Lione

(57) ABSTRACT

A multi-turn rotary encoder that includes a first code carrier connected with an input shaft, a scanning device that scans the first code carrier and generates an absolute position of the input shaft within one revolution, and a digital code word is present at an output of the scanning device and a second code carrier for measuring the number of revolutions of the input shaft. A reduction gear is arranged between and coupled to the first and second code carriers. The second code carrier includes a magnetic body with at least one north and south pole and a substrate with a spatial arrangement of sensor elements integrated therein, which are sensitive to magnetic fields, is associated with the magnetic body. An evaluation circuit integrated into the substrate, wherein scanning signals, which are phase-shifted with respect to each other, from the sensor elements are supplied, and that the evaluation circuit combines the scanning signals in such a way that a second digital code word is present serially or in parallel at an output of the evaluation circuit. A combination logical device, which is supplied with the first and second digital code words and which forms a resultant multi-digit code word therefrom.

12 Claims, 4 Drawing Sheets

U.S. PATENT DOCUMENTS

| | | | | |
|---|---|---|---|---|
| 4,730,110 A | * | 3/1988 | Spaulding | 341/10 |
| 4,758,769 A | | 7/1988 | Carrigan et al. | |
| 4,777,706 A | * | 10/1988 | Stanislaw | 28/110 |
| 4,843,388 A | * | 6/1989 | Miyamoto | 341/15 |
| 4,990,909 A | * | 2/1991 | Ueda et al. | 341/15 |
| 5,063,382 A | * | 11/1991 | Ohsumi | 341/15 |
| 5,066,857 A | | 11/1991 | Ernst | |
| 5,254,926 A | * | 10/1993 | Miller et al. | 318/798 |
| 5,646,523 A | | 7/1997 | Kaiser et al. | |
| 5,687,103 A | | 11/1997 | Hagl et al. | |
| 5,734,266 A | | 3/1998 | Spies | |
| 6,194,710 B1 | | 2/2001 | Mitterreiter | |

FOREIGN PATENT DOCUMENTS

| | | |
|---|---|---|
| DE | 42 20 502 | 12/1993 |
| DE | 44 09 892 | 9/1995 |
| DE | 44 36 496 | 4/1996 |
| DE | 44 40 214 | 5/1996 |
| DE | 195 15 940 | 11/1996 |
| EP | 0 227 333 | 7/1987 |
| EP | 0 550 794 | 7/1993 |
| EP | 0 714 171 | 5/1996 |
| EP | 0 715 151 | 6/1996 |
| GB | 2 176 616 | 12/1986 |

OTHER PUBLICATIONS

Heidenhain Company Prospectus entitled "Code–Drehgeber" (Rotary Encoder), published by Heidenhain, Apr., 1997, p. 9.

Pending Patent Application Assigned to Dr. Johannes Heidenhain GmbH: Ser. No.: 09/354.047, Filing Date: Jul. 15, 1999, Inventor: Mitterreiter.

Pending Patent Application Assigned to Dr. Johannes Heidenhain GmbH: Ser. No.: 09/365,118, Filing Date: Jul. 30, 1999, Inventor: Michel et al.

Pending Patent Application Assigned to Dr. Johannes Heidenhain GmbH: Ser. No.: 09/496,503, Filing Date: Feb. 02, 2000, Inventor: Brandl et al.

Pending Patent Application Assigned to Dr. Johannes Heidenhain GmbH: Ser. No.: 09/506,752, Filing Date: Feb. 18, 2000, Inventor: Feichtinger.

Pending Patent Application Assigned to Dr. Johannes Heidenhain GmbH: Ser. No.: 09/666,742, Filing Date: Sep. 20, 2000, Inventor: Tondorf et al.

* cited by examiner

MULTITURN ROTARY ENCODER WITH MULTIPLE CODE CARRIERS COUPLED BY A REDUCTION GEAR

Applicants claim, under 35 U.S.C. § 119, the benefit of priority of the filing date of May 6, 1998 of a German patent application, copy attached, Serial Number 198 20 014.5, filed on the aforementioned date, the entire contents of which is incorporated herein by reference.

BACKGROUND OF THE INVENTION

1. Field of the Invention

It is necessary in many cases to absolutely determine the position of a shaft within one revolution, as well as the number of revolutions. Multi-turn rotary encoders are employed for this purpose, such as those described in EP 0 715 151 B1 and DE 42 20 502 C1. EP 0 715 151 B1 corresponds to U.S. Pat. No. 5,734,266, the entire contents of which are incorporated herein by reference.

2. Description of the Related Art

The multi-turn rotary encoder in accordance with EP 0 715 151 B 1 is described on page 9 of the HEIDENHAIN Company Prospectus: Code-Drehgeber [Rotary Encoder], April 1997. Several code disks are connected with each other by a gear for the detection and differentiation of a plurality of revolutions of a shaft. Each code disk includes several code tracks with alternatingly arranged north and south poles. The code tracks are differently divided, for example, the coarsest one has only one north and south pole each, the next finer track has two north and south poles each, and the finest track has eight north and south poles each. The code tracks are scanned by Hall sensors. An absolute multi-digit code word is formed by the combination of the scanning signals of all Hall sensors, which indicates the absolute angular position of the code disk.

It is disadvantageous in connection with this multi-turn rotary encoder that a code disk with several code tracks must be used in order to generate a multi-digit code word.

In the multi-turn rotary encoder in accordance with DE 42 20 502 C1 several code disks are also respectively connected with each other by means of a reduction gear. Each code disk includes a magnetic drum with a single north and south pole. Two Hall sensors, which are arranged offset from each other by 90°, are provided on the circumference of the magnetic drum. The magnetic field of the magnetic drum, which passes through the Hall sensors, is radially oriented. An analog sine and cosine signal is generated in one revolution of the magnetic drum. The analog sine and cosine signals of all code disks are fed to an evaluation unit, which forms the multi-digit code word, which in turn indicates the absolute angular position of the code disk over several revolutions.

It is disadvantageous here that it is necessary to mount the Hall sensors individually on a plate.

SUMMARY OF THE INVENTION

An advantage and object of the present invention is based on creating a multi-turn rotary encoder which is simply constructed and can be manufactured cost-effectively.

This advantage and object is attained by a multi-turn rotary encoder that includes a first code carrier connected with an input shaft, a scanning device that scans the first code carrier and generates an absolute position of the input shaft within one revolution, and a digital code word is present at an output of the scanning device and a second code carrier for measuring the number of revolutions of the input shaft. A reduction gear is arranged between and coupled to the first and second code carriers. The second code carrier includes a magnetic body with at least one north and south pole and a substrate with a spatial arrangement of sensor elements integrated therein, which are sensitive to magnetic fields, is associated with the magnetic body. An evaluation circuit integrated into the substrate, wherein scanning signals, which are phase-shifted with respect to each other, from the sensor elements are supplied, and that the evaluation circuit combines the scanning signals in such a way that a second digital code word is present serially or in parallel at an output of the evaluation circuit. A combination logical device, which is supplied with the first and second digital code words and which forms a resultant multi-digit code word therefrom.

An advantage and object of the present invention reside in that all sensor elements for scanning one or several code carriers are integrated in one chip and therefore are extremely accurately aligned with each other and have the identical characteristics.

Exemplary embodiments of the invention are represented in the drawings.

DESCRIPTION OF THE PREFERRED EMBODIMENT(S)

Figure 1:
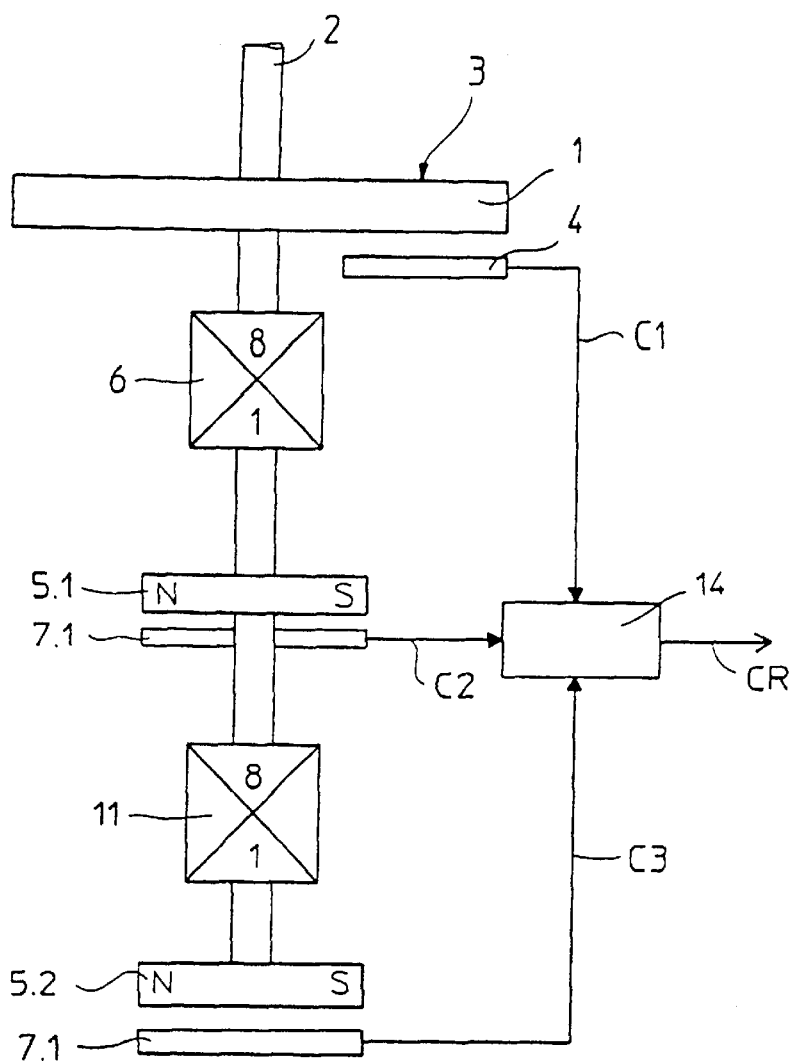
FIG. 1 schematically shows the principle of an embodiment of a multi-turn rotary encoder according to the present invention.

The principle of a multi-turn rotary encoder is represented in FIG. 1. It includes a single-turn element and a multi-turn element. The single-turn element includes a code disk 1, which is directly coupled with the input shaft 2 which is to be measured. The code disk 1 has a coding 3, which can be scanned in an opto-electrical, magnetic, capacitive or inductive manner in order to divide a revolution of the input shaft 2 into a plurality of differentiable sectors. Usually this coding 3 is a multi-track Gray code, however, it can also be formed by a single-track chain code. The coding 3 is scanned by a scanning device 4, so that a multi-digit code word C1 is present at the output of the single-turn element, which indicates the absolute position of the input shaft 2 within a single revolution.

The multi-turn element is provided for detecting the number of revolutions of the input shaft 2. It includes at least one code carrier 5.1, which is coupled with the input shaft 2 by a reduction gear 6. An eightfold reduction has been selected in the example represented.

As shown in FIG. 1, it is particularly advantageous if one or more reduction gears 11 is/are connected downstream of the code carrier 5.1, by means of which one or more further code carriers 5.2 is/are driven in a geared-down manner. It is particularly advantageous if all code carriers 5 of the multi-turn element are identically designed. Because of this it is possible to also design the corresponding scanning devices 7.1, 7.2 identically, which simplifies stock keeping and considerably reduces the purchase price.

Figure 2:
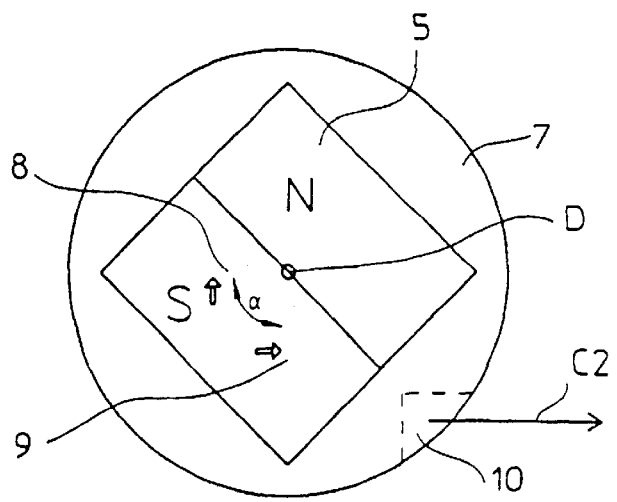
FIG. 2 shows a top view of a first embodiment of a rotatable code carrier with a scanning device to be used with the multi-turn rotary encoder of FIG. 1 according to the present invention.

Each code carrier 5, such as code carriers 5.1, 5.2, has a single dipole, i.e. a north and a south pole. The poles of a code carrier 5 are scanned by a scanning device 7, such as scanning devices 7.1, 7.2. The scanning device 7 includes a semiconductor substrate, into which several sensor elements 8, 9, which are sensitive to magnetic fields, have been integrated. This semiconductor substrate 7.3 is shown enlarged in FIG. 2. In the simplest case, two sensor elements 8, 9 in the form of Hall sensors are integrated. In the example, the sensitive sensor faces extend vertically with respect to the substrate surface and are arranged rotated with respect to each other at an angle $\alpha$. For example, the Hall sensors 8, 9 have maximum sensitivity in the direction indicated by the two-headed arrow, but are insensitive to magnetic fields extending parallel with their longer drawn-in sides. A rotating magnetic field is generated by the magnet of the code carrier 5 being rotated around the axis of revolution D, whose field lines lie parallel with the substrate surface in the area of the Hall sensors 8, 9, but which change their direction with respect to this surface as a function of the angle of rotation. Therefore each one of the Hall sensors 8, 9 provides an analog sinusoidal scanning signal per revolution of the magnet of the code carrier 5. When the angle $\alpha=90°$, the scanning signals are phase-shifted with respect to each other by 90°, and it is possible by means of known interpolation methods to differentiate between a plurality of absolute positions from this within one revolution of the magnet of the code carrier 5. The evaluation circuit 10 necessary for this is also integrated into the substrate 7.3. The evaluation circuit 10 links the analog scanning signals from the Hall sensors 8, 9 in such a way, that several digital signals of different periods are present at the output and form a Gray code, for example, or that a multi-digit code word C2 is already serially present at the output.

Figure 3:
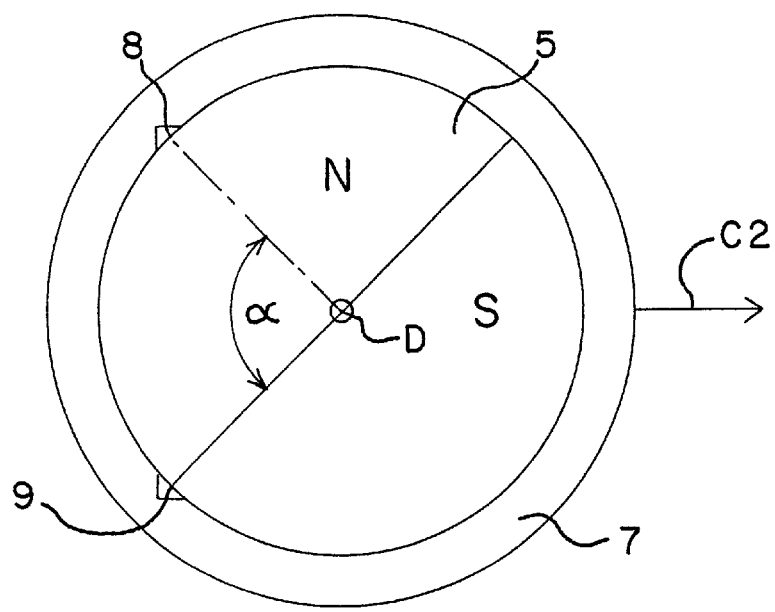
FIG. 3 shows a top view of a second embodiment of a rotatable code carrier with a scanning device to be used with the multi-turn rotary encoder of FIG. 1 according to the present invention.

However, the arrangement of the Hall sensors 8, 9 can also be selected in accordance with FIG. 3. The sensitive surface of the Hall sensors 8, 9 extends parallel with the surface of the substrates 7.3, and the effective magnetic field of the magnet of the code carrier 5 extends vertically with respect to the substrate surface. This arrangement has the advantage that the Hall sensors 8, 9 can be arranged at the outermost circumference of the substrate 7.3, from which a large angular resolution results. The space in the center of the substrate 7.3 can be optimally utilized for the evaluation circuit 10.

The multi-digit code words C1, C2, C3 respectively formed in the individual scanning devices 4, 7.1, 7.2, or the respectively formed digital signals of differing periods, are fed to a combination logical device 14, which forms a resultant multi-digit code word CR from them and passes it on to a follow-up electronic device.

Figure 4:
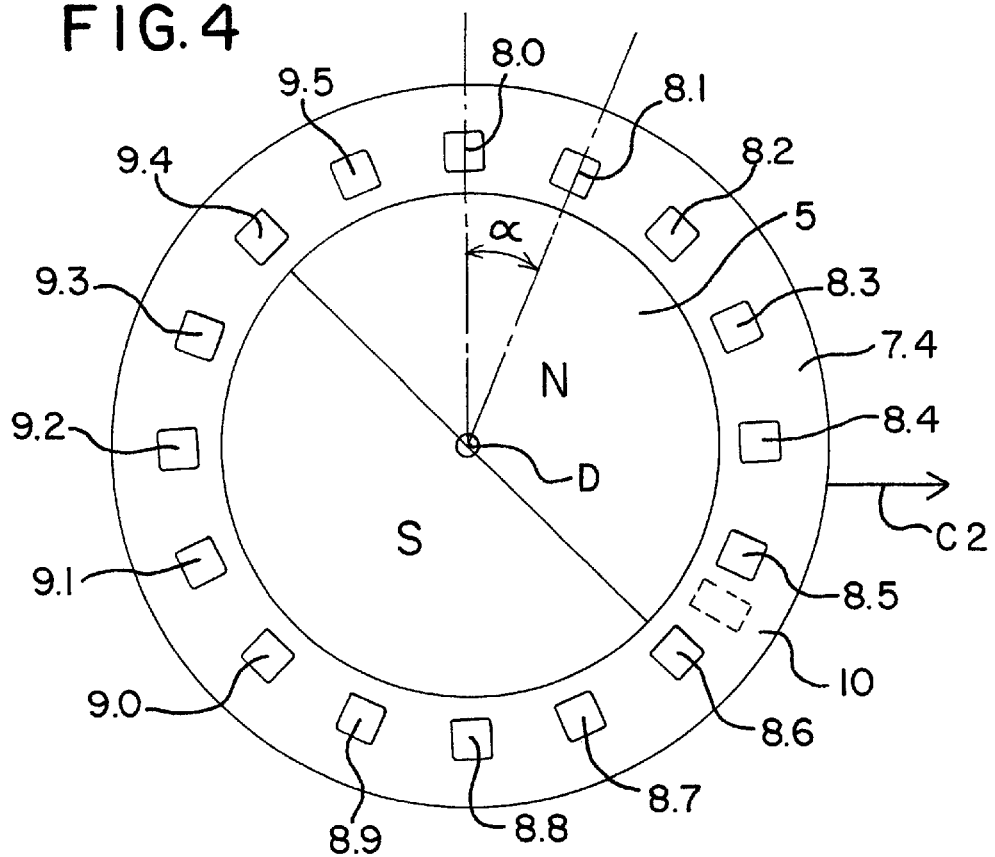
FIG. 4 shows a top view of a third embodiment of a rotatable code carrier with a scanning device to be used with the multi-turn rotary encoder of FIG. 1 according to the present invention.

In place of only two sensor elements 8, 9, it is possible in an advantageous manner to integrate a plurality of sensor elements 8.0 to 9.5 in the semiconductor substrate, each forming angles $\alpha$ of less than 90° with each other. An example of this is represented in FIG. 4. Here, the semiconductor substrate is identified by 7.4, and the sensor elements in the form of Hall sensors by 8.0 to 9.5. The code carrier 5 is again embodied as a dipole with a single north and south pole. To compensate eccentricities during the rotation of the code carrier 5 around the axis of rotation D, the sensor elements 8.0 to 9.5 are arranged symmetrically with respect to the axis of rotation D. Each sensor element 8.0 to 9.5 provides one sinusoidal scanning signal with one period per revolution of the magnet of the code carrier 5.

The two scanning signals required for interpolation, which are offset by 90° with respect to each other, are obtained by the combination of the scanning signals from the sensor elements 8.0 to 9.5 in that the respective scanning signals of the sensor elements 8.0 to 9.5, which are spatially located opposite each other, are subtracted from each other.

In the example in accordance with FIG. 4 this means that the analog scanning signals from the sensor elements 8.0 to 8.7 lying within a first sector of 180° are added to form a first sum signal, and the analog scanning signals from the associated, oppositely located sensor elements 8.8 to 9.5 are added to form a second sum signal. Both sum signals are switched to the difference circuit, wherein the resultant 0°—signal is present at the output of the difference circuit. The scanning signal which is phase-shifted by 90° with respect to this is generated in the same way by summing the scanning signals from the sensor elements 8.4 to 9.1 located in a second sector of 180°, in that the analog scanning signals from the sensor elements 8.4 to 9.1 are added to form a third sum signal, and the analog scanning signals from the oppositely located sensor elements 9.2 to 8.3 are added to form a fourth sum signal. Both sum signals are switched to the difference circuit, wherein the resultant 90° signal is present at the output of the difference circuit. The second sector is spatially displaced by 90° with respect to the first sector.

The scanning signals, phase-shifted by 90° with respect to each other, generated in this way again have one period per revolution of the magnet of the code carrier 5, wherein harmonic waves and eccentricity errors are compensated to a large extent by the combination of the scanning signals. Therefore a particularly accurate absolute position determination within one revolution of the magnet of the code carrier 5 is possible by the interpolation of these two scanning signals.

The interpolation can be performed in a known manner by a resistance network, by arctan calculation or by the evaluation of tables. The interpolation unit assigns a unique absolute position within a period to each combination of amplitudes of the two resultant analog scanning signals. For example, a division by $2^5=32$-fold can take place.

Figure 5:
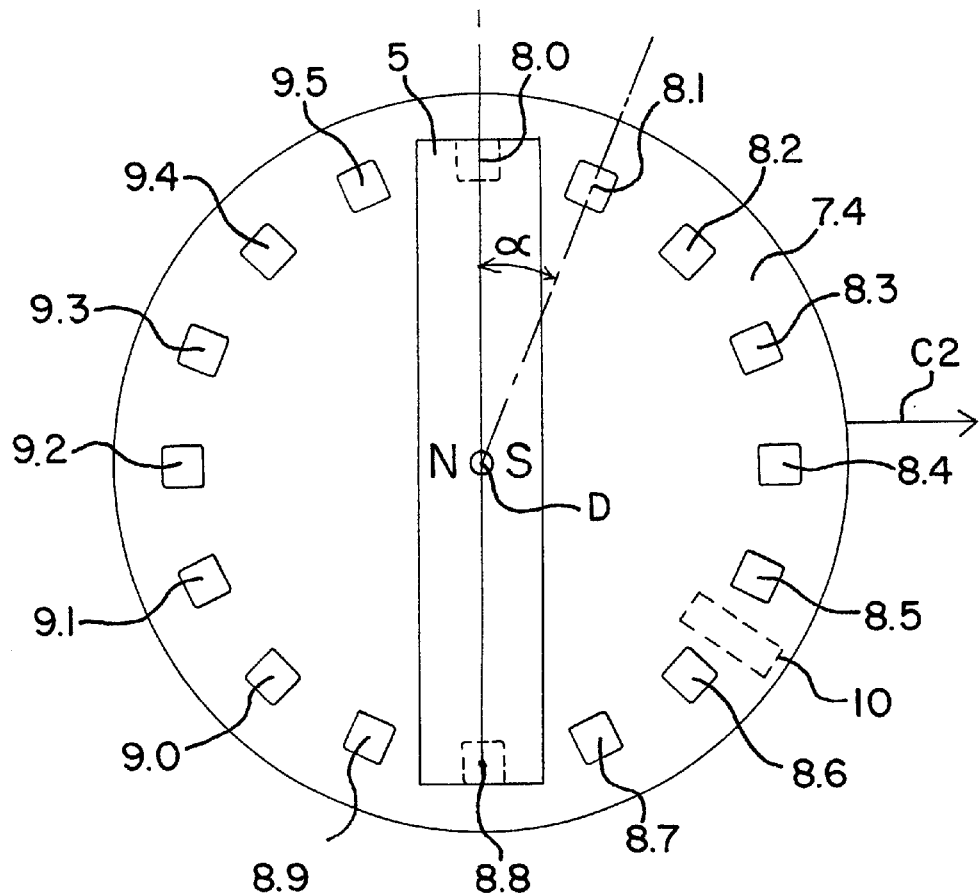
FIG. 5 shows a top view of a fourth embodiment of a rotatable code carrier with a scanning device to be used with the multi-turn rotary encoder of FIG. 1 according to the present invention.

It is essential for the invention that the circuit elements required for the described evaluation and generation of a multi-digit code word C2, C3 are integrated in the substrate 7.4. In FIGS. 4 and 5 this integrated evaluation circuit is schematically identified by the reference numeral 10 and dashed lines.

In the example in accordance with FIG. 4, the magnet of the code carrier 5 is a disk- or drum-shaped body. The Hall sensors 8.0 to 9.5 are arranged spatially distributed over the outer circumference, so that their sensitive surfaces are oriented parallel with the surface of the substrate 7.4 and are affected by a magnetic field, which is oriented vertically with respect to the substrate surface, of the magnet of the code carrier 5. The effect of the magnetic field on the individual sensor elements 8.0 to 9.5 is a function of the instantaneous position of rotation of the magnet of the code carrier 5. The evaluation unit 10 arranged in the substrate surface—which for example is enclosed by the sensor elements 8.0 to 9.5—derives the absolute position from the magnetic field distribution. A memory is provided for this, in which the allocation of the sensor elements 8.0 to 9.5 to the angle value is stored. If it is found, for example, that the sensor elements 8.1, 8.2 lie in the range of the maximum magnetic field, an angle value of 20° is put out. To determine the location of the instantaneous maximal magnetic field it is also possible to interpolate between two sensor elements. When evaluating the instantaneous magnetic field position, the sensor elements 8.1, 8.2 can be detected, which output maximum signals, or it is also possible to determine a position where a transition from maximal to minimal signals is present, in the example this would be the sensor elements 9.3, 9.4.

A further variation is represented in FIG. 5. In contrast to FIG. 4, the sensor elements 8.0 to 9.5 are arranged underneath the magnet 5. The effective magnetic field lies in the area of the dividing line between the north and the south pole.

Figure 7:
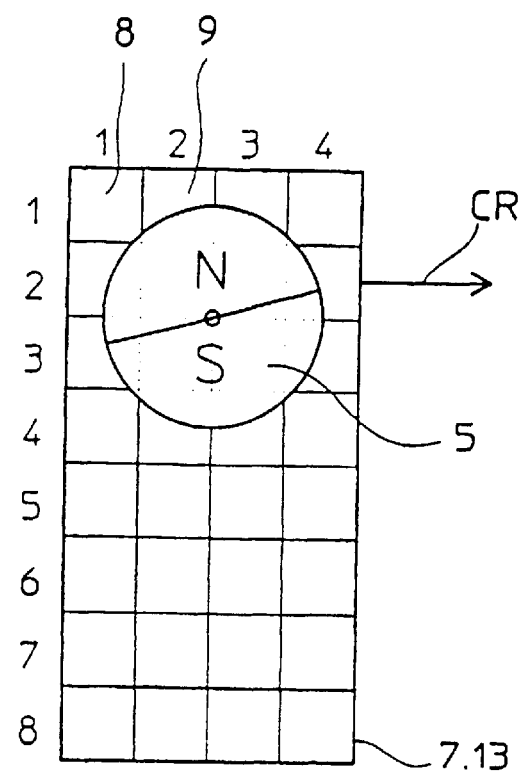
FIG. 7 shows a top view of a second embodiment of a code carrier which can be rotated, as well as displaced, in relation to a scanning device to be used with the multi-turn rotary encoder of FIG. 1 according to the present invention.
Figure 8:
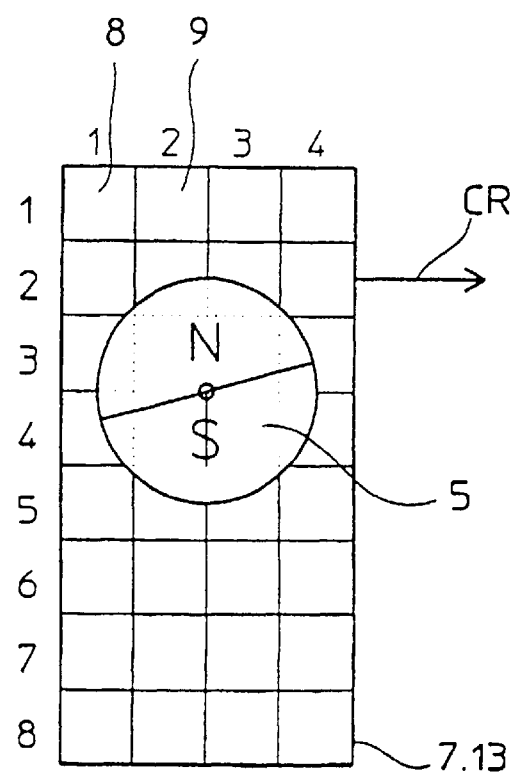
FIG. 8 shows the code carrier in accordance with FIG. 7 in a further position according to the present invention.

The sensor elements 8, 9 of several scanning devices 7 of the multi-turn element can also be integrated in a common substrate 7.13. Examples of this are represented in FIGS. 6 to 8.

Figure 6:
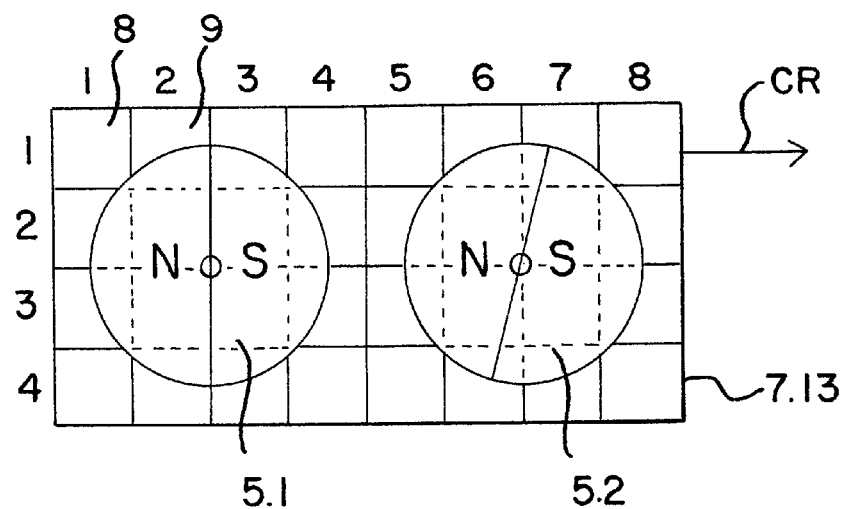
FIG. 6 shows a top view of a first embodiment of a common scanning device for several code carriers to be used with the multi-turn rotary encoder of FIG. 1 according to the present invention.

In accordance with FIG. 6, the code carriers 5.1, 5.2, each of which is driven via a reduction gear 6, 11 in accordance with FIG. 1, are located in a common plane. The scanning devices 7.1 and 7.2 are integrated into a common substrate 7.13. For this purpose a two-dimensional sensor array of sensor elements 8, 9, which are sensitive to magnetic fields, is formed in the substrate 7.13. In the example, the array includes four lines (numbered 1–4) and eight columns (numbered 1–8) of individual elements. Only two of the elements 8, 9 have been provided with reference numerals for reasons of clarity. The absolute rotary position of each magnet 5.1, 5.2 can be determined as described in connection with FIGS. 2 to 5. Alternatively to this there is the possibility of determining the absolute position from the instantaneous magnetic field distribution of both code carriers 5.1, 5.2 on the sensor array 7.13 by logical evaluation. One of ordinary skill would understand that such logical evaluation would include having a logic device generating a code word that is representative of the absolute position based on the instantaneous position of the magnets 5.1, 5.2. Such a logic device can be in the form or a table structure that enables "if-then" decisions to be performed. An example of an "if-then" decision would be—If the north pole of the magnet 5.1 rests above a sensor element positioned at row 2, column 2 and the north pole of the magnet 5.2 rests above a sensor element positioned at row 2, column 6, then this corresponds to a preset condition.

The reduced movement transfer between the two code carriers 5.1, 5.2 is not limited to a rotary movement.

The reduction gears 6, 11 represented in FIG. 1 can also be combined into a common reduction gear, so that the code carrier 5 not only performs a rotary movement around an axis of rotation D, but also a further displacement movement, superimposed on the rotary movement, or a further rotary movement in relation to the sensor array 7.13. This example is schematically represented in FIGS. 7 and 8. Following a revolution of the code carrier 5, the code carrier 5 is displaced from the position represented in FIG. 7 into the position represented in FIG. 8. The second reduction gear 11 simulates the superimposed movement, it can be linear, rotatory or spiral-shaped. The superimposed movement can take place continuously or in steps.

In the examples in accordance with FIGS. 4 to 8, the code division includes the spatial distribution of the sensor elements. As explained previously, the spatial distribution of the sensor elements is used as the position information of the magnetic body. Here, an address, which defines the position information of the sensor element in relation to the other sensor elements, and therefore the spatial distribution on the semiconductor substrate, is assigned to each sensor element.

Interface components and output drivers can also be integrated into the semiconductor substrate 7, 7.4, 7.13.

The drawings are basic representations and are not drawn to scale. Actually, the surface of a sensor element is approximately 0.2 mm times 0.4 mm.

It is also possible to employ other magnetically sensitive sensor elements, such as magnetoresistive elements or flux gates, in place of Hall sensors.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A multi-turn rotary encoder, comprising:
    a first code carrier connected with an input shaft;
    a scanning device that scans said first code carrier and generates an absolute position of said input shaft within one revolution, and a digital code word is present at an output of said scanning device;
    a second code carrier for measuring the number of revolutions of said input shaft;
    a reduction gear arranged between and coupled to said first code carrier and said second code carrier;
    said second code carrier comprises a magnetic body with at least one north and south pole;
    a substrate with a spatial arrangement of sensor elements integrated therein, which are sensitive to magnetic fields, is associated with said magnetic body;
    an evaluation circuit integrated into said substrate, wherein scanning signals, which are phase-shifted with respect to each other, from said sensor elements are supplied, and that said evaluation circuit combines said scanning signals in such a way that a second digital code word is present serially or in parallel at an output of said evaluation circuit; and
    a combination logical device, which is supplied with said first and second digital code words and which forms a resultant multi-digit code word therefrom.

2. A multi-turn rotary encoder, comprising:
    a first code carrier connected with an input shaft;
    a scanning device that scans said first code carrier and generates an absolute position of said input shaft within one revolution, and a digital code word is present at an output of said scanning device;

a second code carrier for measuring the number of revolutions of said input shaft;

a reduction gear arranged between and coupled to said first code carrier and said second code carrier;

said second code carrier comprises a magnetic body with at least one north and south pole;

a substrate with a spatial arrangement of sensor elements integrated therein, which are sensitive to magnetic fields, is associated with said magnetic body;

an evaluation circuit integrated into said substrate, wherein scanning signals, which are phase-shifted with respect to each other, from said sensor elements are supplied, and that said evaluation circuit combines said scanning signals in such a way that a second digital code word is present serially or in parallel at an output of said evaluation circuit;

a combination logical device, which is supplied with said first and second digital code words and which forms a resultant multi-digit code word therefrom;

wherein said second code carrier comprises a magnetic body with only a single north and south pole, so that each of said sensor elements generates a periodic sinusoidal scanning signal per revolution of said magnetic bodies.

3. The multi-turn rotary encoder in accordance with claim 2, further comprising a third code carrier, wherein said second and third code carriers are driven at different reductions by said input shaft, and each of said second and third code carriers is scanned by corresponding first and second semiconductor substrates.

4. A multi-turn rotary encoder, comprising:

a first code carrier connected with an input shaft;

a scanning device that scans said first code carrier and generates an absolute position of said input shaft within one revolution, and a digital code word is present at an output of said scanning device;

a second code carrier for measuring the number of revolutions of said input shaft;

a reduction gear arranged between and coupled to said first code carrier and said second code carrier;

said second code carrier comprises a magnetic body with at least one north and south pole;

a substrate with a spatial arrangement of sensor elements integrated therein, which are sensitive to magnetic fields, is associated with said magnetic body;

a third code carrier, wherein said second and third code carriers are driven at different reductions by said input shaft, and each of said second and third code carriers is scanned by corresponding first and second semiconductor substrates;

an evaluation circuit integrated into said substrate, wherein scanning signals, which are phase-shifted with respect to each other, from said sensor elements are supplied, and that said evaluation circuit combines said scanning signals in such a way that a second digital code word is present serially or in parallel at an output of said evaluation circuit; and a combination logical device, which is supplied with said first and second digital code words and which forms a resultant multi-digit code word therefrom.

5. The multi-turn rotary encoder in accordance with claim 4, wherein said first and second semiconductor substrates are identically designed.

6. The multi-turn rotary encoder in accordance with claim 4, wherein said second and third carriers comprises a magnetic body with a single north and south pole.

7. A multi-turn rotary encoder, comprising:

a first code carrier connected with an input shaft;

a scanning device that scans said first code carrier and generates an absolute position of said input shaft within one revolution, and a digital code word is present at an output of said scanning device;

a second code carrier for measuring the number of revolutions of said input shaft;

a reduction gear arranged between and coupled to said first code carrier and said second code carrier;

said second code carrier comprises a magnetic body with at least one north and south pole;

a substrate with a spatial arrangement of sensor elements integrated therein, which are sensitive to magnetic fields, is associated with said magnetic body and wherein said substrate comprises a semiconductor;

an evaluation circuit integrated into said substrate, wherein scanning signals, which are phase-shifted with respect to each other, from said sensor elements are supplied, and that said evaluation circuit combines said scanning signals in such a way that a second digital code word is present serially or in parallel at an output of said evaluation circuit; and a combination logical device, which is supplied with said first and second digital code words and which forms a resultant multi-digit code word therefrom.

8. A multi-turn rotary encoder, comprising:

a first code carrier connected with an input shaft;

a scanning device that scans said first code carrier and generates an absolute position of said input shaft within one revolution, and a digital code word is present at an output of said scanning device;

a second code carrier for measuring the number of revolutions of said input shaft;

a reduction gear arranged between and coupled to said first code carrier and said second code carrier;

said second code carrier comprises a magnetic body with at least one north and south pole;

a substrate with a spatial arrangement of sensor elements integrated therein, which are sensitive to magnetic fields, is associated with said magnetic body and wherein each of said sensor elements comprises a Hall element;

an evaluation circuit integrated into said substrate, wherein scanning signals, which are phase-shifted with respect to each other, from said sensor elements are supplied, and that said evaluation circuit combines said scanning signals in such a way that a second digital code word is present serially or in parallel at an output of said evaluation circuit; and a combination logical device, which is supplied with said first and second digital code words and which forms a resultant multi-digit code word therefrom.

9. The multi-turn rotary encoder in accordance with claim 8, wherein said sensor elements form an array arrangement with n sensor elements, with n greater than or equal to four.

10. The multi-turn rotary encoder in accordance with claim 6, wherein said sensor elements are integrated into a common semiconductor substrate for scanning said second and third code carriers.

11. A multi-turn rotary encoder, comprising:

a first code carrier connected with an input shaft;

a scanning device that scans said first code carrier and generates an absolute position of said input shaft within one revolution, and a digital code word is present at an output of said scanning device;

a second code carrier for measuring the number of revolutions of said input shaft;

a reduction gear arranged between and coupled to said first code carrier and said second code carrier, wherein said reduction gear causes said first code carrier to rotate about a direction of rotation, as well as a displacement along a displacement direction that is superimposed on said rotation;

said second code carrier comprises a magnetic body with at least one north and south pole;

a substrate with a spatial arrangement of sensor elements integrated therein, which are sensitive to magnetic fields, is associated with said magnetic body;

an evaluation circuit integrated into said substrate, wherein scanning signals, which are phase-shifted with respect to each other, from said sensor elements are supplied, and that said evaluation circuit combines said scanning signals in such a way that a second digital code word is present serially or in parallel at an output of said evaluation circuit; and a combination logical device, which is supplied with said first and second digital code words and which forms a resultant multi-digit code word therefrom.

12. The multi-turn rotary encoder in accordance with claim 11, wherein said sensor elements are integrated two-dimensionally in said direction of rotation, as well as in said displacement direction, next to each other in a semiconductor substrate.

* * * * *

UNITED STATES PATENT AND TRADEMARK OFFICE
CERTIFICATE OF CORRECTION

PATENT NO. : 6,542,088 B1
DATED : April 1, 2003
INVENTOR(S) : Steffen Bielski et al.

It is certified that error appears in the above-identified patent and that said Letters Patent is hereby corrected as shown below:

<u>Title page,</u>
Item [73], Assignees, delete "Heidenheim" and substitute -- Heidenhain -- in its place.

Signed and Sealed this

Twenty-fourth Day of February, 2004

JON W. DUDAS
*Acting Director of the United States Patent and Trademark Office*